Patented Dec. 19, 1950

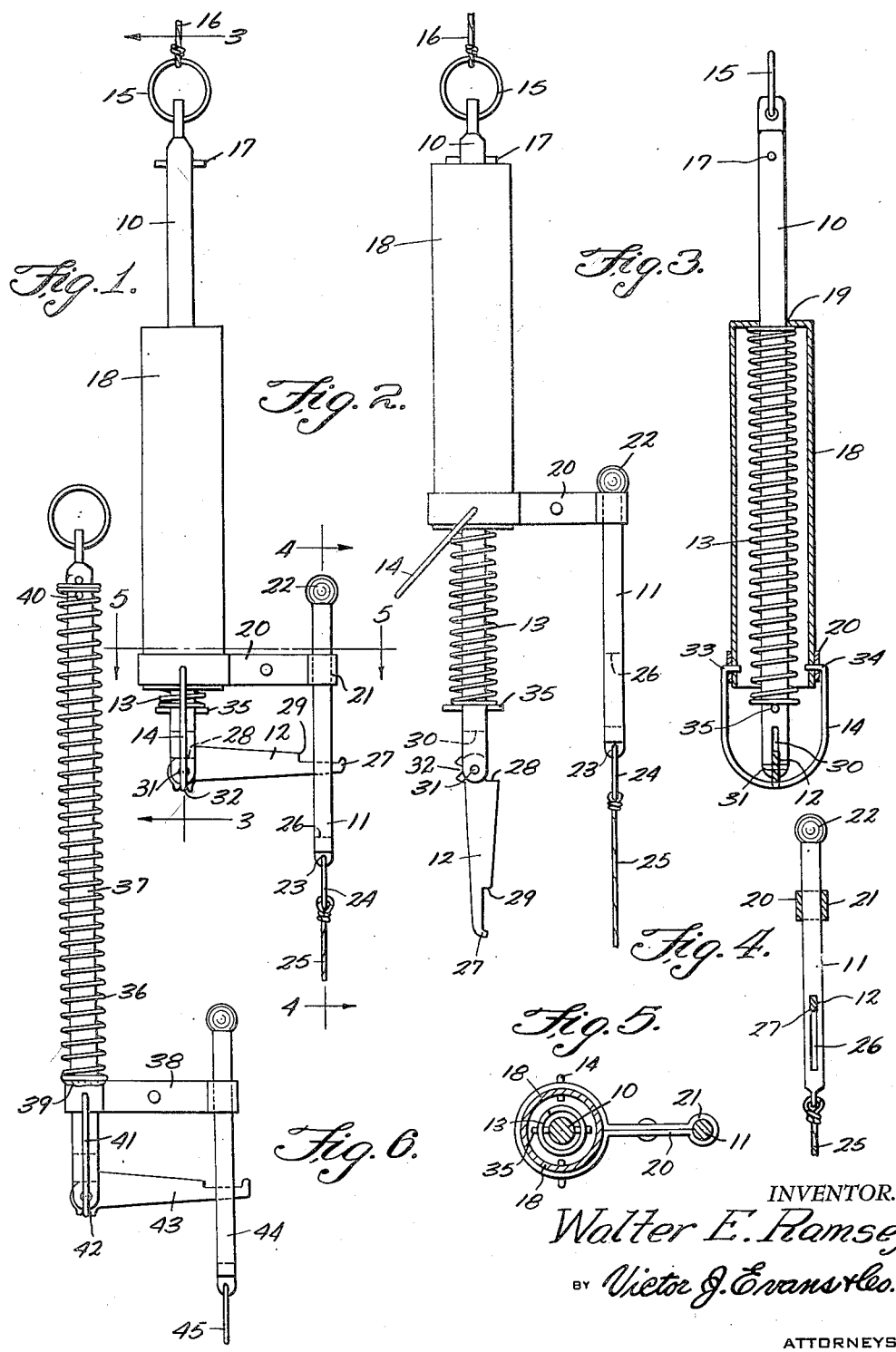

2,534,795

UNITED STATES PATENT OFFICE 2,534,795

AUTOMATIC FISH CATCHER

Walter E. Ramsey, Graham, Tex.

Application June 23, 1948, Serial No. 34,659

3 Claims. (Cl. 43—15)

This invention relates to attachments for fishing lines to facilitate catching fish, and in particular, an actuator adapted to be incorporated in a fishing line, to import a quick snap or jerk to the hook of a fishing line as a fish strikes.

The purpose of this invention is to provide means in a fishing line that automatically responds to the jerk or pull of a fish, so that a hook is withdrawn instantly, as soon as the fish strikes. In the usual fishing line, the bait is often lost because the fisherman is not alert, or does not feel the slight pull of some fish. The bait is not only lost, but many fish are also lost for this reason. With this thought in mind, this invention contemplates a device with a spring trip that instantly jerks the hook automatically, as soon as the fish strikes the bait.

The object of this invention, is therefore, to provide an attachment that may be readily incorporated in fishing lines which may be set when a bait is applied to a hook, so that a pull on the hook will release a trigger that releases actuating mechanism which instantly pulls the hook.

Another object of the invention is to provide a device for suspending a hook from a fishing line that may readily be incorporated in or attached to the end of substantially any line.

A further object of the invention is to provide an actuator for fishing lines that automatically jerks the hook with a snap action, which is of a simple and economical construction.

With these and other objects in view, the invention consists of new and useful combinations, and other features and advantages of the invention will appear from the following description taken in connection with the drawings, wherein:

Figure 1 is a view showing a side elevation of the actuator, with the parts set ready for use.

Figure 2 is a similar view, showing the parts released.

Figure 3 is a partial vertical section through the device taken on line 3—3 of Figure 1.

Figure 4 is a partial vertical section taken on line 4—4 of Figure 1, illustrating the plunger.

Figure 5 is a sectional plan taken on line 5—5 of Figure 1.

Figure 6 is a view illustrating a modification wherein a tension spring is used, and the surrounding casing omitted.

Referring now to the drawings wherein like reference characters denote corresponding parts, the actuator of this invention includes a rod 10, a plunger 11, a trigger 12, a spring 13, and a bail 14.

The rod 10 is provided with a ring 15 at the upper end to which a fishing line 16 may be attached, and a pin 17 is provided below the ring to limit upward movement of a cylindrical casing 18, mounted on the rod and having an opening 19 in the upper end.

An arm 20 is fixedly attached to the lower end of the casing 18, and the outer end of the arm is provided with a socket 21 in which the plunger 11 is slidably held. The plunger is formed with a head 22 at the upper end, and the lower end is provided with an eye 23, having a ring 24 therein from which the hook of the fishing line may be suspended by a leader 25. The plunger is also provided with a slot 26, through which the small end 27 of the trigger 12 extends.

The trigger 12 is formed with shoulders 28 and 29, and the inner end is pivotally mounted in a slot 30 in the lower end of the rod 10 by a pin 31. The lower surface of the trigger is provided with a notch 32, in which the bail 14 is positioned as shown in Figure 1, to hold the trigger in the upper position with the shoulder 28, against the surface of the rod 10.

The bail 14 is provided with inwardly extending ends, 33 and 34, by which it is pivotally mounted in the lower end of the casing 18 through the arm 20 as shown in Figure 3.

The rod 10 is provided with a pin 35 that forms a seat for the lower end of the spring 13, the upper end of which bears against the upper end of the casing 18 as shown in Figure 3.

In setting the device, the end 27 of the trigger is placed through the slot 26 in the plunger, and the bail 14 is snapped into the notch 32. As a fish strikes a hook suspended by the leader 25, the plunger 11 is drawn downward wherein the bail 14 is released from the notch 32 so that the spring 13 snaps the casing with the arm 20 upward, and as the socket 21 strikes the head 22 of the plunger 11, the hook is snapped upward.

In the modification illustrated in Figure 6, the casing 18 is omitted, and a spring 36 on a rod 37 is welded to an arm 38, similar to the arm 20, at the point 39, and the upper end of the spring is held by a pin 40, so that in setting the device the arm is drawn downward, placing the spring in tension until a bail 41 is snapped into a notch 42 in a trigger 43. The end of the trigger extends into a slot in a plunger 44, similar to the plunger 11, and as a fish strikes a hook suspended by a ring 45 at the end of the plunger, the spring is released, so that it draws the plunger upward, similar to the movement of the plunger 11.

It will be understood that modifications may be made in the design and arrangement of the parts without departing from the spirit of the invention.

What is claimed is:

1. In a fishing line snap actuator, the combination which comprises a rod having a line attaching eye in one end and a slot through the other, a flat bar having a shoulder on one edge spaced from one end with a recess in the same edge and spaced from the opposite end providing a trigger, means pivotally mounting the end of the said flat bar on which the shoulder is positioned in the slot of the rod, said trigger having a notch in the end thereof through which it is pivotally mounted in the rod and on the side thereof opposite to that on which the shoulder is positioned, an arm extended outwardly from the rod and having hubs on the ends thereof slidably mounted through the hub at one end thereof on the rod, a spring on the rod between the hub of the arm and eye of the opposite end, a bail pivotally mounted in the hub of the arm that is positioned on the rod and positioned to snap into the notch of the trigger for holding the spring, a plunger having a trigger receiving notch therethrough slidably mounted in the hub on the extended end of the arm and positioned with the slot therethrough positioned to receive the trigger, and a line attaching ring on the extended end of the plunger.

2. In a fishing line snap actuator, the combination which comprises a rod having a line attaching eye in one end and a slot through the other, a flat bar having a shoulder on one edge spaced from one end with a recess in the same edge and spaced from the opposite end providing a trigger, means pivotally mounting the end of the said flat bar on which the shoulder is positioned in the slot of the rod, said trigger having a notch in the end thereof through which it is pivotally mounted in the rod and on the side thereof opposite to that on which the shoulder is positioned, an arm extended outwardly from the rod and having hubs on the ends thereof slidably mounted through the hub at one end thereof on the rod, a tubular casing slidably mounted on the rod and through which the hub of the arm is slidably mounted on the rod, a spring on the rod positioned in the casing with one end bearing against an end of the casing and the other held by means secured to the rod, a bail pivotally mounted in the hub of the arm that is positioned on the rod and positioned to snap into the notch of the trigger for holding the spring, a plunger having a trigger receiving notch therethrough slidably mounted in the hub on the extended end of the arm and positioned with the slot therethrough positioned to receive the trigger, and a line attaching ring on the extended end of the plunger.

3. In a fishing line snap actuator, the combination which comprises a rod having a line attaching eye in one end and a slot through the other, a flat bar having a shoulder on one edge spaced from one end with a recess in the same edge and spaced from the opposite end providing a trigger, means pivotally mounting the end of the said flat bar on which the shoulder is positioned in the slot of the rod, said trigger having a notch in the end thereof through which it is pivotally mounted in the rod and on the side thereof opposite to that on which the shoulder is positioned, a pin extended through the rod, a spring positioned on the rod with one end thereof in engagement with the pin extended through the rod, a tubular casing enclosing the spring and slidably mounted through one end thereof on the rod, an arm carried by the tubular casing and extended outwardly from the casing and rod, a bail pivotally mounted on the lower end of the casing and positioned to snap into the notch of the trigger for holding the spring, a plunger having a trigger receiving notch therethrough slidably mounted in the outer end of the arm and positioned with the slot thereof positioned to receive the trigger, and a line attaching ring on the extended end of the plunger.

WALTER E. RAMSEY.

REFERENCES CITED

The following references are of record in the file of this patent:

UNITED STATES PATENTS

| Number | Name | Date |
|--------|------|------|
| 263,638 | Wentworth | Aug. 29, 1882 |
| 751,734 | Hymers | Feb. 9, 1904 |
| 1,012,899 | Nelson | Dec. 26, 1911 |